United States Patent Office 3,501,770
Patented Mar. 17, 1970

3,501,770
SHIPPING FEVER VACCINE
Charles Gale and Earl E. Ose, Indianapolis, Ind., assignors to Eli Lilly and Company, Indianapolis, Ind., a corporation of Indiana
No Drawing. Continuation-in-part of application Ser. No. 565,397, July 15, 1966. This application Apr. 13, 1967, Ser. No. 630,529
Int. Cl. A61k 23/00
U.S. Cl. 424—89                                           10 Claims

ABSTRACT OF THE DISCLOSURE

A vaccine of the inactivated virus type for immunizing cattle against shipping fever prepared by mixing inactivated *parainfluenza-3* virus and inactivated *Pasteurella multocida* and *hemolytica* bacteria cultures to an effective McFarland density and absorbing these inactivated organisms on an aluminum ion adjuvant.

CROSS-REFERENCE

This application is a continuation-in-part of our co-pending application, Ser. No. 565,397, filed July 15, 1966, now abandoned.

BACKGROUND OF THE INVENTION

This invention relates to a shipping fever vaccine of the inactivated or killed virus type. More particularly, this invention provides an improved killed virus-bacteria composition which has the capacity to provide substantially complete protection to cattle against bovine *Myxovirus parainfluenza-3* virus infection and Pasteurellosis associated with shipping fever.

The occurrence of *Myxovirus parainfluenza-3* virus and Pasteurella organisms in the respiratory tract of cattle has been well documented. That these agents are important etiological agents in the shipping fever complex is now well established. The etiological factors in shipping fever are apparently a complex of several elements. The hypothesis of a virus, perhaps latent, being activated by the stress of shipment to make a favorable environment for secondary bacteria finds some support in experimental studies conducted by those in the veterinary medical science. It is well established that *Myxovirus parainfluenza-3* viruses are widely distributed and result in a spectrum of clinical disorders varying from mild subclinical disease to severe disease that can result not only in clinically apparent respiratory signs but death of the animal. A considerable amount of data indicated that Pasteurella species plays a role in shipping fever have appeared in the literature.

The vaccines prepared before this invention, in attemps to find an effective immunizing agent for healthy cattle against the shipping fever disease or complex, have not been satisfactory in that they have provided inadequate protection. In the Cornell Veterinarian, vol. 54, 1 (January 1964), in an article entitled "Experimental Immunization of Cattle Against Shipping Fever," it was concluded that a formol-inactivated vaccine composition in which the virus and bacterial portions were concentrated separately and mixed with an oil adjuvant gave inadequate protection. Thus, earlier vaccines have failed to provide the desired immunization in cattle. The cattle raising industry is still seeking a satisfactory immunizing composition for use in preventing the effects of the shipping fever complex in cattle.

SUMMARY OF THE INVENTION

It is an object of this invention to provide an effective shipping fever vaccine.

Another object is to provide a method for preparing a satisfactory inactivated virus-bacteria composition which will produce antigens to prevent the ravages of shipping fever in cattle.

Another object is to provide a method for immunizing healthy cattle against *Myxovirus parainfluenza-3* virus and Pasteurellosis associated with the shipping fever complex.

Other objects of the invention and its advantages over the prior art will be apparent from the following description.

Briefly, in accordance with this invention *Myxovirus parainfluenza-3* virus, is grown according to conventional methods in a tissue culture of fetal or adult bovine, simian, rabbit or similar monolayer submerged kidney cells, either primary cells or a cell line, until the virus-inoculated cells exhibit a cytopathogenic effect characteristic of this strain of virus.

In a separate operation, *Pasteurella multocida* and *Pasteurella hemolytica* are separately grown in agar or liquid nutrient media. If desired, the virulence of the bacteria may be increased by first growing the bacteria in chicken embryo allantoicamnionic sac tissue or in tissues of mice, rabbits, or guinea pigs. Each of these bacteria is then separately harvested from its growth medium, by commingling portions of virus harvest fluid with the respective bacteria-containing media to obtain separate live virus-*P. multocida* and virus-*P. hemolytica* bacteria mixtures. The separate virus-bacteria mixtures are adjusted to about equal density within the range of from about 5 to 10 times McFarland tube number one, as measured by the standard McFarland method, and then portions of the separate virus-bacteria mixtures are commingled. The pH of the combined virus-*P. multocida* and *P. hemolytica* bacteria mixture is adjusted to about 6.6±0.2, and then the mixture is commingled with an aluminum ion-containing adjuvant by suitable mixing procedures.

The adjuvant-containing virus-bacteria composition is then inactivated by the addition of formaldehyde. After the formaldehyde-treated virus-bacterial mixture has been inactivated, any excess formaldehyde is neutralized with a suitable sulfite salt solution. Samples of the inactivated virus-bacterial composition are set aside for bacteriological and virus antigenicity tests and then the bulk of the product is preserved by treating it with a suitable parenterally acceptable antiseptic in bacteriostatic and fungistatic amounts. The resulting inactivated virus-bacteria-adjuvant composition may be used as such or can be concentrated by decanting supernatant liquid to yield a product of increased potency.

Alternatively, the *Myxovirus parainfluenza-3* culture, the *P. hemolytica* culture, and the *P. multocida* culture may be separately inactivated with formaldehyde-containing media, and then mixed, either before or after adding the aluminum ion adjuvant to the virus-containing culture. We prefer to add the aluminum ion adjuvant to the inactivated virus culture before the inactivated *P. hemolytica* and *P. multocida* cultures are added. This allows separate tests to be made with virus-*P. hemolytica* and virus-*P. multocida* mixtures to determine the proportions of virus culture and *P. hemolytica* and *P. multocida* cultures necessary to obtain optimum virus-bacterium mixtures. After the aluminum ion adjuvant has been mixed with the virus culture, the calculated amounts of inactivated *P. hemolytica* and *P. multocida* cultures can be added to obtain the vaccine composition of the desired density.

The *M. parainfluenza-3* virus seed cultures used in preparing the vaccine composition of this invention must satisfy the following criteria: The virus must cause the characteristic cytopathogenic effect in bovine kidney tissue cultured cells in 2 to 5 days. The virus must be neutralized by specific parainfluenza-3 antiserum. The virus must cause hemagglutination (HA) of guinea pig red blood cells. The virus must also cause hemadsorption of guinea pig red blood cells in infected cultures. The virus-containing seed cultures used in practicing this invention should have a virulence HA titer of 1:40 or higher on guinea pig red blood cells and have an infectivity titer in bovine kidney tissue cultures of $10^3$ per milliliter or higher. The virus cultures are routinely checked for bacteriological sterility and freedom from Pleuropneumonia-like organisms.

The virus seed and production cultures are propagated in primary or cell line or diploid cell strains from embryonic or adult bovine or simian kidney tissues, which are prepared by trypsinidation of the tissues and dispersion of the cells in Hank's or Earle's balanced salt solution enriched with a small amount of lactalbumin hydrolysate. The production culture medium may contain bovine serum if desired, but it is not essential. Small amounts of penicillin and streptomycin can be used in the mixture as preservatives. The vessels used can be of any appropriate size. We have grown the virus in vessel sizes ranging from 2-ounce prescription bottles to 5-liter "Pyrex" Povitsky bottles. The virus seed culture is lyophilized with sterile distilled water and suitable stabilizer.

The production culture medium is inoculated with the lyophilized seed culture aseptically.

The seed volume is generally about 4 percent to 6 percent of the production medium volume.

The virus is grown in this medium until a titer of at least $10^3$ virus infected cells per milliliter is obtained. We prefer to grow the virus until the titer is about $10^6$ virus infected cells per milliliter. By way of example, a suitable virus titer may be obtained by incubating a virus-inoculated primary bovine kidney cell medium at about 35–38° C. for 2 to 7 days.

Only those virus-containing vessels which are visibly free of bacteria or other contamination are considered for the virus harvest. Satisfactory virus-laden tissue culture fluids are harvested by aseptically transferring the culture fluids, including the cells, directly to the bacteria mixing step or to suitable pooling containers for use in washing each bacteria growth medium. This usually takes place from about 2 to 7 days after inoculation of the growth media. The live virus-containing fluid can be used immediately or, optionally, may be frozen and stored at refrigerator or freezer temperature to increase the virus harvest obtained, and to maintain the virus for later use. A virus-containing culture fluid must have an HA titer of 1:40 or higher with guinea pig red blood cells and have virus infectivity titer in bovine kidney tissue cultures of at least $10^3$ virus particles per milliliter of medium to be satisfactory for use as a bacteria wash fluid in this invention.

As indicated above, the virus-containing tissue culture may first be inactivated with formaldehyde before mixing it with the bacterial cultures.

Seed cultures of Pasteurella organisms may be grown in commercially available nutrient media by conventional methods.

In producing larger quantities of each bacterium, a lyophilized vial of each bacterial strain is used to inoculate large volumes of agar or tryptose broth to be used as production inoculum after 7 to 24 hours incubation. The quantity of seed can vary depending upon the vessel used. Usually enough of the bacterial broth seed culture is used to cover the agar surface. When liquid culture media are used, the medium is inoculated with from about 1 to 5 percent by volume of seed in the production broth culture. The bacterial cultures are incubated at about 35–38° C. for a time sufficient to allow the bacterial titer to grow to at least $10^7$, preferably $10^9$, viable bacterial cells per milliliter.

Separate live P. hemolytica and P. multocida cultures may be mixed with live parainfluenza-3 virus tissue culture fluid, and then the mixture inactivated with formaldehyde. Alternatively, the P. hemolytica and P. multocida cultures may be separately inactivated by the addition thereto of suitable formaldehyde solutions, stored until ready for use, and then mixed with the virus tissue culture. In mixing the virus tissue culture with the bacterium cultures, care is taken in the proportions of the virus culture fluid and bacterium culture fluids used to insure that the final virus-bacteria fluid density is equivalent to the above-indicated McFarland range. Formaldehyde inactivated virus-bacterium culture mixture may also be mixed to provide a composition of the required McFarland density.

After mixing the virus tissue culture fluid with each bacterium culture fluid, each virus-bacteria mixture can be adjusted to substantially the same density by addition of virus tissue culture fluid or bacteria culture as needed. Using the McFarland density measurement scale as a reference, we prefer to adjust the density of each virus-bacteria mixture to about 7 to 8 times McFarland tube number one, although any density between about 5 and 10 times McFarland number one may be used. If the Pasteurella cultures are grown in a liquid medium, enough of the virus tissue culture fluid is used to dilute the individual Pasteurella pools to the desired final density. The Pasteurella culture should not represent more than about 25 percent of the volume of the virus-bacteria mixture.

After adjusting the separate M. parainfluenza-3 virus-P. multocida and M. parainfluenza-3 virus-P. hemolytica mixtures to the desired density, substantially equal volumes of the separate pools are commingled, and the pH of the resulting mixture is adjusted to 6.4 to 6.8 by suitable addition of an acid, such as 0.1 N hydrochloric acid or a base such as sodium hydroxide as necessary. To the pH-adjusted mixture thus obtained, the aluminum ion-containing adjuvant is added. Alternatively, the virus culture, the P. hemolytica culture, and the P. multocida culture may be separately inactivated with formaldehyde solution. After determining the proportions of virus culture and P. hemolytica culture, and virus culture and P. multocida culture which give a composition of the desired density as determined, e.g., by the above-described test methods, the inactivated virus culture may be mixed with the aluminum ion adjuvant mixture before the determined amounts of P. hemolytica and P. multocida cultures are mixed with the virus culture.

The aluminum ion-containing adjuvant used must be one which contains the trivalent aluminum ion in a pharmaceutically acceptable form. It may be in the form of an aqueous solution of a suitable aluminum salt, an adsorptive solid, or an aqueous aluminum ion-containing gel. Examples of suitable aluminum ion forms which may be used include aqueous aluminum hydroxide or aluminum oxide gels or aqueous dispersions, and aluminum salts and mixed salts of aluminum and various acids. Preferred forms of the aluminum ion-containing material are an aqueous aluminum hydroxide gel, an aqueous active alumina suspension, and a hydrated aluminum phosphate, in freshly precipitated form for greatest activity. These materials may be prepared by metathesis of suitable precursor salts in aqueous solution or suspension, and then filtering and washing the resulting precipitate, suitable precautions being taken to insure sterility before use. Aluminum phosphate can be prepared, for example, by commingling aqueous solutions of aluminum chloride and disodium hydrogen orthophosphate, or aluminum potassium sulfate and trisodium orthophosphate. The resulting precipitate is filtered off and washed with water to remove soluble materials, and then can be added in the wet state to the inactivated virus culture or to the virus-bacteria mixture as described above. The aluminum ion-containing material is commingled with the inactivated virus-culture or virus-bacteria mixture in an aqueous solution or gel or absorptive solid dispersion having an aluminum compound concentration of from about 0.5 percent to about 5 percent by weight, preferably from about 1 to 2 percent by weight, and is added in an amount to be chemically equivalent to from about 10 to 50 milliliters, preferably 10 to 30 ml. of an aqueous 1.3 percent by weight of aluminum oxide ($Al_2O_3$) per 100 ml. of virus-bacteria culture mixture. The resulting mixture should be agitated to insure uniform composition. A 15-minute stirring is usually sufficient for this purpose.

For the inactivation, or virus-bacteria killing step, formaldehyde is added. The formaldehyde solution is added in an amount to provide a concentration sufficient to inactivate the virus and bacteria without materially impairing the antigenicity of the resulting vaccine. Usually about 0.075 to about 0.125 percent by weight of formaldehyde is sufficient for this purpose. It is understood, however, that formaldehyde can be employed in any form which provides the active aldehyde for contact with the virus and bacteria, e.g., trioxymethylene, solid polymeric formaldehyde, or formaldehyde condensation products and the like which release formaldehyde in aqueous media. It will be equally apparent that the formaldehyde composition should not include substances which would be detrimental to the vaccine composition if they must be allowed to remain in the composition.

The inactivation of the virus and bacteria appears to be essentially complete in about six hours. As a precautionary measure however, the formaldehyde treated cultures are preferably held for at least about 24 hours, but not more than about four days at room temperature. Other inactivating agents which may be used to replace part or all of the formaldehyde are beta-propiolactone, hydroxylamine, phenol, and chloroform and the like. Formaldehyde is preferred however.

After the holding period, the composition can be concentrated, if desired, by removing a portion of the supernatant liquid. Excess formaldehyde in the resulting vaccine composition is then neutralized with a suitable formaldehyde absorber. A convenient neutralization agent for this purpose is a 10 to 35 percent sterile aqueous sodium bisulfite solution. If desired, the excess formaldehyde may be neutralized with the sodium bisulfite prior to mixing the virus composition with the aluminum ion adjuvant. Samples of the resulting product are withdrawn for Standard Requirement P–15 [1] bacteriological sterility testing and virus inactivation safety testing, and then the mixture is treated with a suitable parenterally acceptable antiseptic as a bacteriostatic and fungistatic preservative. Examples of antiseptics which may be used include chloroform, phenol, and thimerosal. We prefer to add thimerosal to a concentration of about 0.4 ml. to about 0.6 ml. of a 10 percent solution per liter of bulk product, but other antiseptics may be used. The completed bulk vaccine can be packaged immediately or stored at refrigerator temperature pending final container filling.

Viral safety testing is accomplished by the inoculation of six tubes of bovine tissue culture monolayers with 0.2 ml. of a 1:30 dilution of the bulk vaccine product, taken prior to the addition of the antiseptic preservative. These six tubes with adequate controls, are observed for 7 to 9 days. If no cytopathogenic effect is found and the controls remain essentially normal, the virus is considered to be inactivated.

The potency of the composition can be measured by several methods. One such test method, which we term the hemagglutination inhibition (HI) activity method, involves the selection of six calves, 3 to 6 months of age, which have blood serum HI activity titers lower than 1:20, as measured by standard procedures with guinea pig red blood cells, and the inoculation of three of these calves with two intramuscular injections of 10-cc. doses of the vaccine-bacterin product with an interval of 2 to 3 weeks between injections. All six calves are housed together during the test period. Samples of blood are taken from the six calves 2 to 3 weeks following the second injection. Comparative HI activity titer testing of pre- and post-vaccination blood serum samples must demonstrate a serum HI titer conversion to 1:80 or higher in the vaccinated calves with no significant increase in the serum titer of the unvaccinated calves. The potency of the composition may also be determined by challenge to vaccinated and unvaccinated calves with a combination of *M. parainfluenza-3* virus and cultures of *P. multocida* and *P. hemolytica* given by the aerosol route or intratracheally or by other suitable route. Signs of shipping fever disease such as increased temperature, cough and nasal discharge must not occur in the vaccinated calves and must occur in the control unvaccinated calves. Potency can also be determined by a suitable serum neutralization (SN) test or by correlating HI titer conversions in guinea pigs. Serological conversion in guinea pigs is indicated by demonstration of a 10-fold increase in geometric mean titer (GMT) in vaccinated guinea pigs with no significant increase in the GMT in the unvaccinated control guinea pigs.

The Pasteurella antigenic properties of the vaccine-bacterin composition of this invention can be established by the following test method:

Swiss mice weighing 15 to 20 g. are each given two 0.2 ml. subcutaneous injections of finished bulk product. The interval between injections is 10–14 days. Seven to 14 days following the second injection, equal numbers of vaccinated and unvaccinated mice are challenged with tenfold dilutions of virulent *P. multocida* broth culture. Both vaccinated and control mice are divided into dilution groups of 5 or more mice. At least 2 dilution groups are used for vaccinated mice and for control mice. The post-challenge observation period is seven days. Fifty percent mortality end points ($LD_{50}$) are calculated for both vaccinated and control mice according to the method of Reed and Muench. The test is considered satisfactory if the $LD_{50}$ in vaccinated mice is at least two logs lower than that demonstrated in the unvaccinated mice.

The dosage recommended for cattle is at least one dose of from 2 to 15-cc. injected intramuscularly or subcutaneously. We prefer to administer two doses of about 10 cc. with an interval of about 1 to 4 weeks between injections.

The vaccine composition of this invention may be incorporated into multiple antigen combinations to permit simultaneous immunization of the cattle against two or more diseases. Such combinations can be made, for example, with antigens for *Brucella sp., Clostridium sp.,* bovine virus diarrhea virus (BVDV), infectious bovine rhinotracheitis, (IBR) and the like.

More in detail, the invention is illustrated by the following examples.

EXAMPLE 1

This example illustrates the preparation of the vaccine bacterin composition of this invention.

Virus preparation

The virus organism used is a culture of *Myxovirus parainfluenza-3* virus originally obtained from Dr. R. S. Reisinger, U.S. Dept. of Agriculture, Beltsville, Maryland from an outbreak of shipping fever. This strain of virus is commonly referred to as the SF-4 strain.

Seed and production cultures of the *M. parainfluenza-3* were propagated in embryonic bovine kidney (BK) monolayer cell cultures prepared by trypsinization and dispersed in Hank's balanced salt solution enriched with 0.5 percent of lactalbumin hydrolysate and bovine serum. Penicillin and streptomycin were used as preservatives.

[1] United States Department of Agriculture Regulation (Agriculture Research Service, Animal Inspection and Quarantine Division), "P–15 Standard Sterility Test Procedures for Veterinary Biological Products."

Production cultures of the *M. parainfluenza-3* were grown in 5-liter Pyrex Povitsky bottles. The seed volume used was approximately 5 percent of the production flask medium volume. The culture flasks containing the seed were incubated at 35–37° C. for 3 to 5 days, or until approximately 65 percent of the inoculated cells were exhibiting cytopathic effects characteristic of the SF-4 strain of virus. Satisfactory virus-laden tissue culture fluids including cells were aseptically transferred to pooling containers. The tissue culture virus harvest, collected from 2 to 7 days after inoculation, was then used, as indicated below, to collect the two different Pasteurella cultures from agar.

Pasturella bacteria portion

Seed cultures of each of *Pasteurella multocida* P1062 and *Pasteurella hemolytica* P1148 strains were separately grown for 8 to12 hours at 37° C. in tryptose broth. These bacteria seed cultures were inoculated in 0.1-ml. volumes into allantoic-amnionic sacs of 8 to 10-day old embryonating chicken eggs. After approximately 24 hours incubation (at which time one-half of the embryos were dead), the eggs were chilled and the allantoic-amnionic fluid harvested and pooled. Each pooled strain of bacteria-containing fluid was lyophilized separately. These cultures were used as the seed inocula.

A vial of each of the above bacteria strains was prepared in tryptose broth ("Difco"). After 10 to 12 hours incubation at 37° C., these cultures were used to inoculate tryptose broth to use as an inoculum for agar. After 12 to 15 hours incubation, separate agar substrates were inoculated using sufficient inoculated tryptose broth culture to cover the entire agar surface. The agar used was a "Difco" starch agar with an additional 1.5 percent agar added. These production agar cultures were incubated at 37° C. for 15 to 18 hours after inoculation.

The bacteria-containing production culture flasks were harvested after 12 to 48 hours by washing the bacteria-containing agar cultures with sufficient *M. parainfluenza-3* harvest tissue culture fluid to remove the bacteria from the agar. The washings were conducted in such a manner that a mixture of virus and *P. hemolytica* and a mixture of virus and *P. multocida* were separately prepared. The density of each mixture was adjusted to 7.5 times McFarland tube number one by the addition of *M. parainfluenza-3* harvest tissue culture fluid and then equal volumes of the mixtures were commingled. The combination product was adjusted to pH 6.6±0.2 by adding 0.1 N hydrochloric acid and then mixed with aluminum hydroxide gel (calculated as containing 1.3 percent $Al_2O_3$) at the rate of 20 ml. of the aluminum hydroxide gel per 100 ml. of the combination product culture mixture. The gel-culture mixture was shaken for 15 minutes to insure complete distribution. Formalin (38 percent aqueous formaldehyde solution) was added as a 10 percent formaldehyde in water solution to give a 0.1 percent formalin concentration and the mixture was shaken for another 15 minutes. The formaldehyde-treated mixture was stored and allowed to react for 24 hours at room temperature, and then the composition was concentrated by decanting approximately one-half of the supernatant fluid. The excess formaldehyde in the remaining combined virus-bacteria-alumina gel mixture was neutralized with 35 percent sterile aqueous sodium bisulfite and then samples of the product were removed for Standard Requirement P-15 bacteriological sterility testing and to insure inactivation of the virus and bacteria contained therein. Merthiolate® brand of thimerosal (10 percent solution) was added to the bulk product at the rate of 0.5 ml. per liter. The completed bulk product, thus obtained, was stored at refrigerator temperature pending final container filling.

The viral safety testing was accomplished by the inoculation of six tubes of bovine tissue culture monolayers with 0.2 ml. of a 1:50 dilution of the bulk product (prior to the addition of Merthiolate®). These six tubes, with adequate controls, were observed for 7 to 9 days. No cytopathic effect (CPE) was found in the inoculated vials, and the controls remained esesentially normal. The virus was thus considered to be inactivated.

EXAMPLE 2

Four lots of vaccine compositions prepared as described in Example 1, were tested in bovine calves and guinea pigs in both a concentrated (one-half of supernatant liquid decanted off before $NaHSO_3$ neutralization) and unconcentrated form, using the hemagglutination inhibition (HI) titer test method.

In this test bovine calves were inoculated by intramuscular injections with two 10-cc. doses of the vaccine product with three weeks between injections. Some calves were inoculated with the unconcentrated composition; others were inoculated with the concentrated vaccine. Guinea pigs were given equivalent doses, of 1 milliliter, with the same interval between injections. Suitable uninoculated control calves and guinea pigs were maintained. Hemagglutination inhibition titer results were collected from all the calves and guinea pigs. The titer values for the four lots of vaccine tested are summarized in the following table.

TABLE I

| Lot No. | Vaccine | Titer | | |
|---|---|---|---|---|
| | | Calves [1] | Guinea Pigs [2] (Nebraska) | Guinea Pigs [2] (Indiana) |
| 1 | None (Control) | [3] 7 | 22 | [4] 5 |
| | Not concentrated | 160 | 49 | 132 |
| | Concentrated | 508 | 113 | 236 |
| 2 | None (Control) | 0 | 9 | ----------- |
| | Not concentrated | 807 | 32 | 132 |
| | Concentrated | 508 | 60 | 539 |
| 3 | None(Control) | 25 | 10 | ----------- |
| | Not concentrated | 807 | 103 | 321 |
| | Concentrated | 320 | 198 | 906 |
| 4 | None (Control) | 160 | 11 | ----------- |
| | Not concentrated | 807 | 297 | 202 |
| | Concentrated | 255 | 260 | 260 |

[1] Mean of 3 calves per value.

[2] Mean of 8–10 guinea pigs per value.

[3] Each number represents the second number in the HI titer ratio 1:N where N is the number in the table.

[4] Only one pen of controls was run for the Indiana tests but all four lots were tested at the same time.

These data and other data illustrate the potency of the vaccine composition of this invention and that the guinea pig as well as the calf can be used for measuring response to the vaccine. This finding was confirmed by statistical analysis.

EXAMPLE 3

This example illustrates the preparation of a shipping fever vaccine composition. This procedure can be used to prepare the vaccine on a commercial scale.

Parainfluenza-3 virus medium and growth procedure

Trypsinized fetal bovine kidney tissue culture (BKTC) cells, extracted from cortex portions of the kidneys were suspended in an appropriate BKTC growth medium, incubated at 35° C. to 37° C. until the BKTC cells were confluent. The supernatant growth medium was discarded and replaced with similar growth medium containing 1 ml. of live *parainfluenza*-3 (SF-4 strain) seed virus for each 99 ml. of growth medium added. The virus inoculated BKTC tissue cultures, thus obtained, were incubated at 35° C. to 37° C. until the observable cytopathogenic effect (CPE) reaches 65 percent to 100 percent, usually 48 to 96 hours after virus inoculation. The virus-containing cell media from several vessels were pooled. After removal of samples for HA titer determination, virus titration, and density tests, the bulk of the live *parainfluenza*-3 virus containing BKTC medium was inactivated by treatment with enough diluted formaldehyde solution (formalin, of commerce) to provide a concentration of about 1 part formaldehyde to 1000 parts of the virus suspension. (The formaldehyde solution was further diluted to 10 percent concentration with a BKTC maintenance medium before adding to the virus containing medium.) The formaldehyde treated *parainfluenza-3* virus medium was stirred vigorously for about 15 minutes.

The growth medium used for growing the cells was a mixture of 24 g. of phenolsulfonphthalein sodium salt, 8.160 kg. of a sodium chloride, 480 g. of potassium chloride, 246 g. of magnesium sulfate, 172.8 g. of monobasic sodium phosphate, 1.2 kg. of dextrose, 318 g. of calcium chloride, 6 kg. of lactalbumin hydrolysate, 672 g. of sodium bicarbonate, 8.3 g. of penicillin G crystals, 120 g. of streptomycin sulfate, and sufficient water to make 1200 liters. The mixture was stirred for 10 minutes, sterilized at 250° F. for 4 hours and cooled to room temperature and 24 liters of bovne serum added before use.

The maintenance medium used contained the same ingredients as the growth medium, except that the maintenance medium contained no phenolsulfonylphthalein, contained 2.664 kg. of sodium bicarbonate instead of the 672 g. of sodium bicarbonate in the growth medium, and contained no bovine serum.

Pasteurella hemolytica

*P. hemolytica* seed culture was first grown on tryptose and thiamine agar plates, incubated at 35° C. for 18 to 36 hours, and then used to inoculate the *P. hemolytica* to tryptose and thiamine broth cultures. The *P. hemolytica* was incubated in the broth cultures for 6 to 18 hours at 35° C. After checks to insure against contamination, the contents of several *P. hemolytica* containing broth cultures were pooled in sterile containers and used as seed for larger cultures of the organism. The *P. hemolytica* may be grown in a roller drum apparatus if desired, or as in this example in large bottles which are shaken during incubation. The growth medium was inoculated with *P. hemolytica* seed culture equivalent to about 3 percent of the production growth medium volume. The production cultures were incubated for 18 to 24 hours at 35° C. on a shaking apparatus. The production cultures were transferred to sterile containers and the density of the *P. hemolytica* culture was determined using a "Cenco" photometer with a green filter, and the meter was set to 100 percent light transmission using a sterile medium for the *P. hemolytica*. This "Cenco" photolometer was previously correlated to reproduce the densities of from about 7 to 8 on the McFarland scale. The *P. hemolytica* thus obtained was inactivated by adding formaldehyde solution thereto. After incubation of the formaldehyde inactivated *P. hemolytica* culture for 48 to 72 hours at 35° C., the inactivated bacterium was stored in a chill room (5° C.) until ready for use in preparing the vaccine composition of this invention.

The growth medium used for growing the *P. hemolytica* consisted of 3.6 kg. of "N–Z Case" brand of a powdered protein and vitamin composition made by tryptic digestion of casein, 1.8 kg. of yeast extract, 1.2 kg. of tryptone, 120 g. of magnesium sulfate, 324 g. of monobasic potassium phosphate, 912 g. of dibanic sodium phosphate, 960 g. of dextrose in 90 liters of water and warmed to 45° C., to which was added yeast autolysate. The pH of the medium was adjusted to 7.2 to 7.3 using 1 normal sodium hydroxide solution, and then distilled water was added to make 120 liters.

Pasteurella multocida

*P. multocida* was propagated as described above for *P. hemolytica*, except that the growth medium contained 480 g. of sucrose instead of the dextrose. After incubation and growth of the *P. multocida* and determination of density, using the "Cenco" photometer, formaldehyde solution was added to the *P. multocida* culture to inactivate the bacterium.

Separate tests were first made with small sample mixtures of the inactivated *parainfluenza-3* virus culture and inactivated *P. hemolytica* culture to determine the amounts of each needed to give a mixture which had the desired optical density on the McFarland scale.

Before mixing the inactivated virus with the inactivated bacterium cultures, the virus culture was mixed with 360 ml. of a sterilized 1.3 percent aluminum oxide suspension for each liter of virus culture and agitated for 15 minutes. Then the required amounts of the inactivated *P. hemolytica* and *P. multocida* cultures are added to the aluminum oxide treated inactivated virus culture and mixed for 15 minutes. The resulting composition was stored at 30° C. for 24 hours, and then the supernatant liquid was decanted to remove a volume equivalent to the total volume of the added bacterial cultures plus 10–30 percent of the volume of the total volume of the virus culture and aluminum oxide suspension mixture.

The formaldehyde in the resulting concentrated, inactivated *parainfluenza-3* virus-*P. hemolytica-P. multocida* composition containing aluminum ion was neutralized with 35 percent sodium bisulfite solution to a Schiff's Reagent end point. While agitating the mixture Merthiolate® brand of thimerosal solution for biologicals was added aseptically at a rate of 0.5 ml. per liter of vaccine. Samples were removed for determination of bulk sterility, *P. multocida* potency (mouse), virus potency (guinea pig), and virus potency (calf). The samples were stored at 5° C. until submission for test. The bulk of the vaccine was stored at 5° C. until approval for packaging.

The aluminum oxide suspension used above was prepared as follows:

Commercially available aluminum oxide gel was diluted with distilled, pyrogen-free water and the resulting suspension was passed through an Eppenbach mill to reduce the gel particle sizes. The aqueous gel suspension thus obtained was sterilized and then cooled to room temperature. The final aluminum oxide gel concentration was calculated as containing the equivalent of approximately 1.3 percent aluminum oxide ($Al_2O_3$) by weight.

We claim:
1. A method for preparing a shipping fever vaccine composition which comprises:
   (a) growing *Myxovirus parainfluenza-3* in bovine or simian kidney tissue culture;
   (b) separately growing *Pasteurella multocida* and *Pasteurella hemolytica* in nutrient media;
   (c) separately harvesting each bacterium from step (b) by commingling virus-laden tissue culture fluid from step (a) with each bacterium culture to obtain separate virus-*Pasteurella multocida* bacterium and virus-*Pasteurella hemolytica* bacterium mixtures;
   (d) adjusting the density of the separate virus-bacterium mixtures from step (c) to about equal density equivalent to from about 5 to 10 times the optical density of McFarland tube number one on the McFarland test method scale by adding virus tissue culture fluid or bacterium culture as necessary;
   (e) mixing the separate virus-bacterium mixtures from step (d);
   (f) adjusting the pH of the resulting combined virus-bacteria mixture from step (e) to about 6.4 to 6.8;
   (g) commingling the pH adjusted combined virus-bacteria mixture from step (f) with an aluminum ion adjuvant selected from the group consisting of aluminum hydroxide gel, aluminum oxide dispersion, and aluminum phosphate in an aluminum ion concentration equivalent to from about 10 to about 30 ml. of an aqueous 1.3 percent $Al_2O_3$ per 100 ml. of the combined virus-bacteria mixture;
   (h) inactivating the virus content of the combined virus-bacteria mixture from step (g) by commingling formaldehyde therewith;
   (i) neutralizing any excess formaldehyde in the formaldehyde treated virus-bacteria mixture from step (h)

with an aqueous alkali metal bisulfite solution; and (j) adding a parenterally acceptable antiseptic thereto in bacteriostatic and fungistatic amounts.

2. An improved shipping fever vaccine prepared by the method of claim 1.

3. A method for preparing an improved shipping fever vaccine composition as described in claim 1, which includes a step of freezing the virus-laden tissue culture fluid from step (a) before commingling it with the bacterial cultures in step (c).

4. An improved shipping fever vaccine composition, prepared by the method of claim 3.

5. A method as described in claim 1 wherein in step (a) the virus is grown in a bovine kidney tissue cell culture until from about 50 to about 70 percent of the cells exhibit the characteristic cytopathogenic effect;

in step (c) the bacterial cultures do not exceed about 25 percent by volume of the separate virus-bacterium mixtures;

in step (d) the density of the separate virus-bacterium mixtures is adjusted to between about 7 and 8 times the McFarland number one tube density;

in step (g) the aluminum ion adjuvant used in an aqueous aluminum hydroxide gel dispersion containing from about 1 to about 2 percent by weight of the aluminum hydroxide gel;

in step (h) the formaldehyde commingled with the combined virus-bacteria mixture is used in an amount to provide a formaldehyde concentration of from about 0.075 to about 0.125 percent by weight; and in step (j) thimerosal is commingled with the inactivated virus-bacteria composition in a concentration of from about 0.4 ml. to about 0.6 ml. of a 10 percent thimerosal solution per liter of bulk product.

6. An improved shipping fever vaccine composition prepared as described in claim 4.

7. A method of immunizing cattle against bovine Myxovirus parainfluenza-3 virus infection and Pasteurellosis associated with shipping fever which comprises injecting cattle with at least one dose of from about 2 to 15 cc. of the improved shipping vaccine composition of claim 2.

8. A method of immunizing cattle against bovine Myxovirus parainfluenza-3 virus infection and Pasteurellosis associated with shipping fever which comprises injecting cattle with two doses, approximating at least about 2 to 15 cc. of the improved shipping fever vaccine composition of claim 5 at an interval of at least about 1 to 4 weeks between injections.

9. A method which comprises (a) growing Myxovirus parainfluenza-3 in bovine or simian kidney tissue cultures;

(b) treating the virus-containing bovine or simian kidney tissue cultures, from step (a) with formaldehyde to inactivate the virus;

(c) separately growing Pasteurella multocida and Pasteurella hemolytica in nutrient media;

(d) treating the Pasteurella multocida and Pasteurella hemolytica from step (c) with formaldehyde to inactivate these respective bacteria;

(e) commingling inactivated virus cuture from step (b) with an aluminum ion adjuvant selected from the group consisting of aluminum hydroxide gel, aluminum oxide dispersion, and aluminum phosphate in an amount chemically equivalent to an aluminum ion concentration of from about 10 to about 50 ml. of an aqueous 1.3 percent $Al_2O_3$ mixture per 100 ml. of the inactivated virus culture;

(f) mixing with the aluminum ion adjuvant containing inactivated virus culture with inactivated Pasteurella hemolytica and Pasteurella multocida cultures from step (d) in amounts sufficient to provide a resulting inactivated virus-bacteria composition having a density of from 5 to 10 times the optical density of McFarland tube number one on the McFarland test method scale.

(g) neutralizing with aqueous alkali metal bisulfite solution excess formaldehyde in the resulting composition from step (f), and (h) adding a parenterally acceptable antiseptic thereto in bacteriostatic and fungistatic amounts.

10. An improved shipping fever vaccine prepared by the method of claim 9.

References Cited

Gale et al., J.A.V.M.A. 142(8): 884–887, Apr. 15, 1963.

King et al., J.A.V.M.A. 142(8): 881–883, Apr. 15, 1963.

Mohanty et al., Am. J. Vet Res. 25: 1653–1657 (1964).

Hamdy et al., Am. J. Vet. Res. 25: 1648–1652 (1964)

Hamdy et al., Cornell Vet. 54: 41–49 (1964).

Matsuoka et al., Proc. 69th Ann. Meet. U.S. Livestock Sanit. Assn.—1965, pp. 104–108 (1966).

S. K. ROSE, Primary Examiner